United States Patent
Aue et al.

(10) Patent No.: US 9,223,780 B2
(45) Date of Patent: Dec. 29, 2015

(54) NON-BLOCKING CACHING TECHNIQUE

(71) Applicant: Microsoft Corporation, Redmond, WA (US)

(72) Inventors: Anthony Aue, Seattle, WA (US); Arul A. Menezes, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 13/719,252

(22) Filed: Dec. 19, 2012

(65) Prior Publication Data

US 2014/0173200 A1    Jun. 19, 2014

(51) Int. Cl.
*G06F 17/30* (2006.01)
*G06F 12/08* (2006.01)

(52) U.S. Cl.
CPC ............ *G06F 17/30* (2013.01); *G06F 12/0802* (2013.01); *G06F 12/084* (2013.01); *G06F 12/0844* (2013.01); *G06F 12/0857* (2013.01)

(58) Field of Classification Search
CPC .............. G06F 12/0802; G06F 12/084; G06F 12/0844; G06F 12/0857
USPC .......................... 711/118, 130, 141–146, 150
See application file for complete search history.

(56) References Cited

U.S. PATENT DOCUMENTS

| | | | |
|---|---|---|---|
| 5,276,835 A | 1/1994 | Mohan et al. | |
| 5,555,392 A | 9/1996 | Chaput et al. | |
| 6,148,371 A | 11/2000 | Hetherington et al. | |
| 6,360,220 B1 | 3/2002 | Forin | |
| 7,844,973 B1 | 11/2010 | Dice | |
| 8,082,397 B1 * | 12/2011 | Ezra et al. | 711/130 |
| 8,145,817 B2 | 3/2012 | Detlefs | |
| 2002/0069326 A1 | 6/2002 | Richardson et al. | |
| 2002/0078302 A1 * | 6/2002 | Favor | 711/133 |
| 2009/0327613 A1 * | 12/2009 | Nutter et al. | 711/141 |
| 2010/0293338 A1 * | 11/2010 | Krishnaprasad et al. | 711/136 |

OTHER PUBLICATIONS

Sundell, Håkan., "Wait-Free Reference Counting and Memory Management", Retrieved at <<http://www.non-blocking.com/download/Sun04_WaitFreeRef_TR.pdf>>, Proceedings: Technical Report in Computing Science at Chalmers University of Technology and Göteborg University, Göteborg, Sweden, Oct. 2004, pp. 11.

* cited by examiner

*Primary Examiner* — Ryan Bertram
(74) *Attorney, Agent, or Firm* — Steve Wight; Sandy Swain; Micky Minhas (57) ABSTRACT

The described implementations relate to processing of electronic data. One implementation is manifested as a system that can include a cache module and at least one processing device configured to execute the cache module. The cache module can be configured to store data items in slots of a cache structure, receive a request for an individual data item that maps to an individual slot of the cache structure, and, when the individual slot of the cache structure is not available, return without further processing the request. For example, the request can be received from a calling application or thread that can proceed without blocking irrespective of whether the request is fulfilled by the cache module.

20 Claims, 8 Drawing Sheets

| | CACHE STRUCTURE 200 | | |
|---|---|---|---|
| SLOT 201 | FINGERPRINT 602 | VALUE 203 | IN_USE 204 |
| 00 | 110 | MarthaJones.jpg file contents | 0 |
| 01 | | | 0 |
| 10 | 001 | JenSmith.jpg file contents | 1 |
| 11 | 111 | Martha_and_Jen.jpg file contents | 0 |

| | CACHE STRUCTURE 200 | | |
|---|---|---|---|
| SLOT 201 | KEY 202 | VALUE 203 | IN_USE 204 |
| 00 | | | 0 |
| 01 | | | 0 |
| 10 | JenSmith.jpg | JenSmith.jpg file contents | 1 |
| 11 | | | 0 |

FIG. 2A

| | CACHE STRUCTURE 200 | | |
|---|---|---|---|
| SLOT 201 | KEY 202 | VALUE 203 | IN_USE 204 |
| 00 | MarthaJones.jpg | MarthaJones.jpg file contents | 1 |
| 01 | | | 0 |
| 10 | JenSmith.jpg | JenSmith.jpg file contents | 0 |
| 11 | | | 0 |

FIG. 2B

| | CACHE STRUCTURE 200 | | |
|---|---|---|---|
| SLOT 201 | KEY 202 | VALUE 203 | IN_USE 204 |
| 00 | MarthaJones.jpg | MarthaJones.jpg file contents | 0 |
| 01 | | | 0 |
| 10 | JenSmith.jpg | JenSmith.jpg file contents | 0 |
| 11 | Martha_and_Jen.jpg | Martha_and_Jen.jpg file contents | 1 |

Void Insert(K k, V v){                              501
    Int slot = MAP(k);                              502
    If(!AcquireBit(slot)) return;                   503
    C_STRUCT[slot].key = k;                         504
    C_STRUCT[slot].value = v;                       505
    ReleaseBit(slot);                               506
}
```

V Lookup(K k){                                      551
    Int slot - MAP(k);                              552
    v ret = NULL;                                   553

If(AcquireBit(slot){                            554
        if (C_STRUCT[slot].key == k){               555
            ret = C_STRUCT[slot].value;             556
        }
        ReleaseBit(slot);                           557
    }
    return ret;                                     558
}
```

FIG. 5B

| | CACHE STRUCTURE 200 | | |
|---|---|---|---|
| SLOT 201 | FINGERPRINT 602 | VALUE 203 | IN_USE 204 |
| 00 | 110 | MarthaJones.jpg file contents | 0 |
| 01 | | | 0 |
| 10 | 001 | JenSmith.jpg file contents | 1 |
| 11 | 111 | Martha_and_Jen.jpg file contents | 0 |

FIG. 6A

| | CACHE STRUCTURE 200 | | |
|---|---|---|---|
| SLOT 201 | FINGERPRINT 602 | VALUE 203 | IN_USE 204 |
| 00 | 110 | MarthaJones.jpg file contents | 1 |
| 01 | | | 0 |
| 10 | 001 | JenSmith.jpg file contents | 0 |
| 11 | 011 | DaveLong.jpg file contents | 0 |

NON-BLOCKING CACHING TECHNIQUE

BACKGROUND

In technical fields such as computer science, caching techniques are often used to provide relatively low-latency access to data. For example, hardware caches on modern computer processors store fixed amounts of data that can be accessed via data writes or reads very quickly. When the cache is not available (e.g., data is not in the cache, the cache or portion thereof is locked, etc.) relatively slower operations can be used instead. For example, instead of using reading or writing to the cache, operations such as reading or writing to main memory (e.g., RAM) or storage (e.g., a hard drive) can be performed instead.

The concept of caching can also be implemented in software. For example, data structures such as hash tables, linked lists, or trees can be used to store computed data values so that future requests for these data values do not involve recomputing the data values. Instead of recomputing the data values, lookup operations into a software cache can be used to retrieve the data from the software cache.

Various techniques have been used to ensure data consistency in hardware and software caches, but these techniques tend to have certain drawbacks. For example, some techniques use relatively heavyweight locking mechanisms to restrict access to a cache or portions thereof, e.g., to ensure cache consistency when two threads attempt to access the same cache data. Other techniques may dedicate portions of a cache to a particular thread or process over an extended execution timeframe, but these techniques often result in redundant caching of data.

SUMMARY

The above listed example is intended to provide a quick reference to aid the reader and is not intended to define the scope of the concepts described herein.

This document relates to processing of electronic data. One implementation is manifested as a technique that can include receiving a lookup request to obtain a data item from a cache structure having a plurality of slots. The data item can map to an individual slot of the cache structure. The technique can also include performing an access check to determine whether the individual slot of the cache structure is available, and, in an instance when the individual slot is not available, returning to the lookup request without checking whether the data item is stored in the individual slot of the cache structure.

Another implementation is manifested as one or more computer-readable storage media comprising instructions which, when executed by one or more processing devices, cause the one or more processing devices to perform acts. The acts can include receiving an insertion request to insert a data item into a cache structure having a plurality of slots. The data item can map to an individual slot of the cache structure. The acts can also include performing an access check to determine whether the individual slot of the cache structure is available, and, in an instance when the slot is not available, returning to the insertion request without inserting the data item into the cache structure.

Another implementation is manifested as a system that can include a cache module and at least one processing device configured to execute the cache module. The cache module can be configured to store data items in slots of a cache structure, receive a request for an individual data item that maps to an individual slot of the cache structure, and, when the individual slot of the cache structure is not available, return without further processing the request.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This discussion relates to electronic data processing, and more particularly to caching of data. For the purpose of this document, the term "cache" includes data storage techniques managed in software as well as in hardware. A cache can be used to store results of various operations (e.g., computations, queries, etc.) so that the results can be accessed with relatively low latency. The disclosed techniques can be implemented for caching of data used for local processing and can also be used in many different network scenarios such as mobile scenarios, client-server scenarios, cloud storage, etc.

For example, some implementations may use a cache for local storage of data on a mobile device. The data may be accessible from a server via network communications, but obtaining the data over the network may involve additional financial costs and/or substantially higher latency compared to accessing a locally-stored copy of the data. As another example, a server may provide an application or service that requires a relatively substantial amount of computation. The server can store computational results in a cache so that subsequent requests for those results do not require recomputation. Some implementations may use multiple data storage techniques together, e.g., a relatively high latency compressed hash table can be used to store computational results and some of the computational results can be stored in an uncompressed form in a lower-latency cache.

Example Scenario

Figure 1:
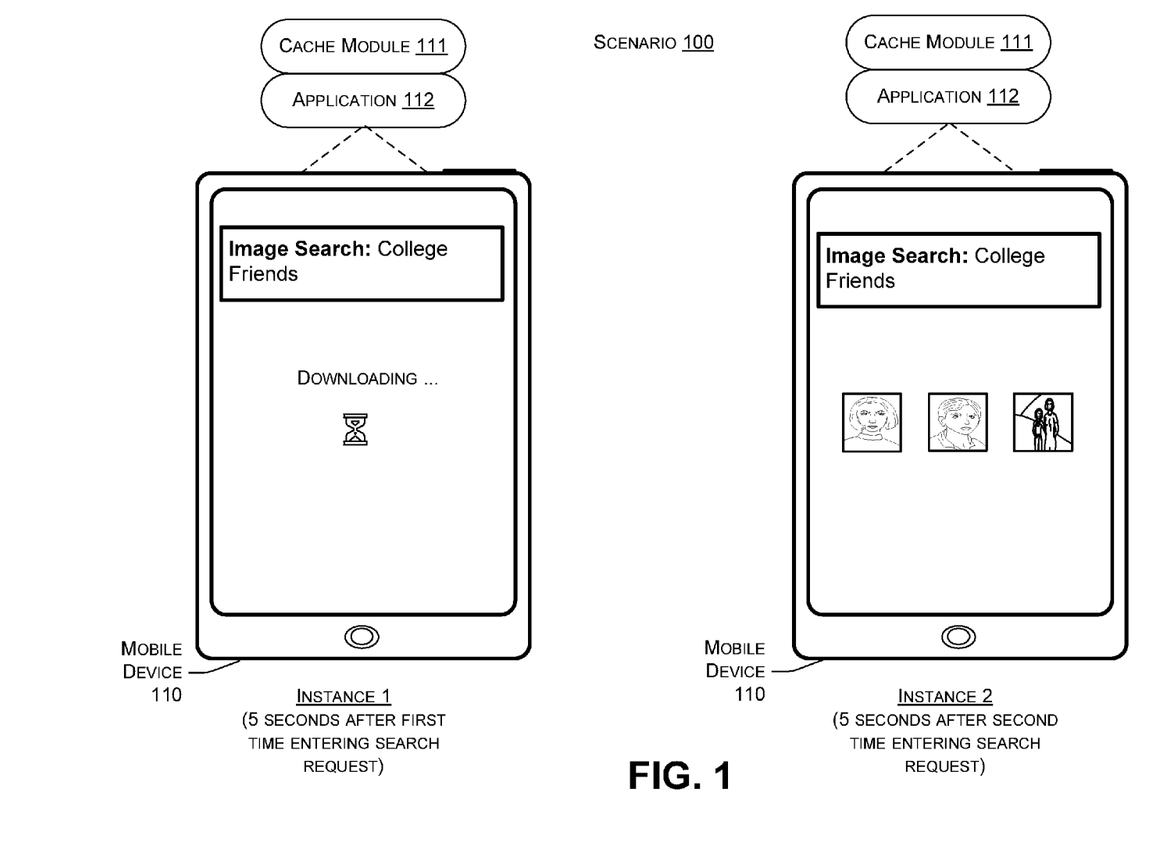
FIG. 1 shows an exemplary scenario in which the present concepts can be employed.

FIG. 1 illustrates a scenario 100 in which a mobile device 110 stores data in a cache module 111 for subsequent retrieval. Scenario 100 involves instances 1 and 2, each of which is discussed below. Starting at instance 1, example scenario 100 shows mobile device 110 in a configuration where the user has searched on their phone for images of their college friends using an application 112. The images may initially be stored remotely from the mobile device, e.g., on a cloud server. Instance 1 may represent the appearance of the mobile device shortly (perhaps five seconds) after the user enters their search request. In this example, the application may be a cloud-enabled social networking application that begins downloading images of the user's college friends from the cloud server. In the interim, the application can display an hourglass icon to show that the mobile device is attempting to retrieve the images.

Cache module 111 can be configured to store images that are downloaded by the mobile device over the network, e.g., responsive to insertion requests received from application 112. Once the user has downloaded the images initially, the images may be stored locally on the device by the cache module. Now, the user may reenter the same search request for "college friends" into the application at a later time, perhaps the next day. The application can submit a corresponding retrieval request to the cache module, and retrieve the images without performing another download from a relatively high-latency cloud server. Thus, as shown in instance 2, the user is presented with the images more quickly than in instance 1 after entering their search request. For example, the user may not see the hourglass icon or the hourglass icon may be displayed for a shorter period of time than in instance 1.

Example Cache Structure

Figure 2A:
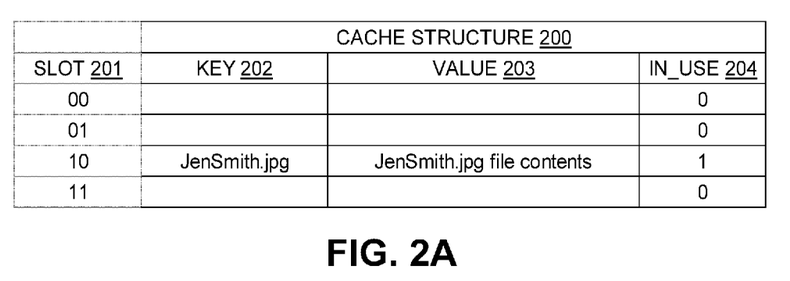
FIGS. 2A-2C, 6A, and 6B show example cache structures in accordance with some implementations.
Figure 2B:
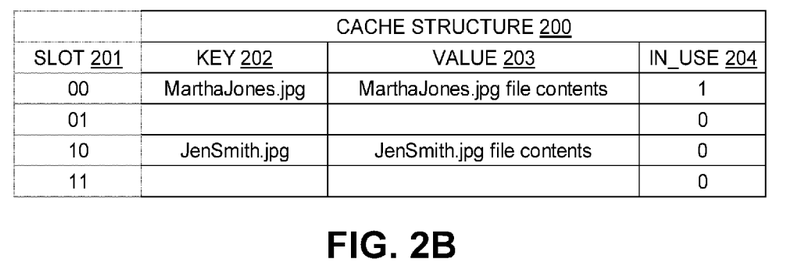
Figure 2C:
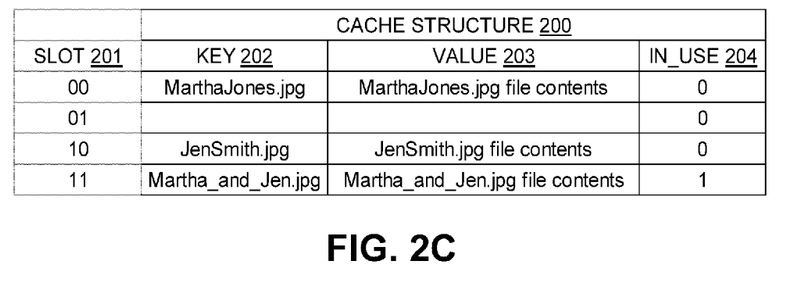

FIGS. 2A-2C show an exemplary cache structure 200. In some implementations, the cache structure can be a data structure that is maintained using logic implemented by cache module 111, as discussed more below. Generally, FIGS. 2A-2C illustrate the cache structure progressing through various states as images are downloaded by mobile device 110. In the example shown, cache structure 200 is implemented using a two-dimensional array, where rows of the array can each store individual data items and associated identifiers in columns of the array, as discussed more below.

Slot column 201 identifies each location where data is stored in the cache structure 200. In this case, each slot corresponds to a single row of a two-dimensional array, and the contents of cache structure 200 for each slot are stored in KEY column 202, VALUE column 203, and IN_USE column 204, as discussed more below. In FIGS. 2A-2C, each slot is represented by a binary number that identifies the address of the slot, e.g., the corresponding row of the two-dimensional array. Note that slot column 201 does not necessarily appear in the actual cache structure but rather can represent an address offset into the cache structure. In some implementations, alternative data structures can be used, e.g., separate arrays for each of KEY, VALUE, and IN_USE columns 202-204, respectively. In such implementations, each row of the individual distinct arrays can correspond to a particular cache slot, e.g., slot 00 refers to the first row of each array, slot 01 refers to the second row of each array, etc.

Generally speaking, KEY column 202 can include various identifiers for corresponding data items that are stored in the cache structure 200. The data items themselves can be stored in VALUE column 203. IN_USE column 204 can be used to restrict access (e.g., provide exclusive access) to individual slots of the cache structure on a slot-by-slot basis. For example, the IN_USE column can be provided in implementations where context switching can occur, e.g., from one thread to another. Until writing/reading operations to a given cache slot have completed, that slot of the caching data structure may be unavailable for use by other threads. As discussed in more detail below, some implementations may initialize the entire IN_USE column to 0, and set IN_USE column 204 to "1" for a given row when data is being written to, or read from, that cache slot.

Thus, some implementations may use a single bit in association with a given cache slot to represent whether the given cache slot is in use. Other implementations may use other levels of granularity for the IN_USE column, e.g., a word instead of a bit. Regardless of whether bits, bytes, words, or other units of data are used for the IN_USE column, operations that modify the IN_USE column can be atomic operations such as compare-and-swap operations that can be implemented using single instructions, as discussed more below. In some architectures, word-level operations can be faster than bit-level operations because word-level operations may not involve any bit masking.

FIG. 2A illustrates cache structure 200 as the image file contents for a file named "JenSmith.jpg" are being written to the cache structure 200 at slot 10. As mentioned above, KEY column 202 can include identifiers of data items, and the data items themselves are stored in VALUE column 203. In the illustrated example, the file name "JenSmith.jpg" is used as a key that identifies the contents of the image file with this name. The image file contents themselves (binary image data) can be stored in VALUE column 203 in slot 10. Before both the key "JenSmith.jpg" and the file contents are written to slot 10, the IN_USE column 204 for that slot can be set to "1" for access control purposes. Once the KEY and VALUE columns for cache slot 10 have been written, the IN_USE column can be set back to 0.

In the example given above, the file name "JenSmith.jpg" is used as a key, and this key maps to cache slot 10. Note that some implementations may use other types of keys, e.g., a database primary key can be used such as an integer data type that identifies (perhaps uniquely) the file with the name "JenSmith.jpg." Example techniques for mapping keys to individual cache slots are discussed in more detail below.

FIG. 2B illustrates cache structure 200 at a later time when a second file is being written to the cache structure at slot 00. In this case, the file name is "MarthaJones.jpg" and the file name is again used as the key. Since "MarthaJones.jpg" is stored in the slot with address 00, it follows that the file name "MarthaJones.jpg" maps to slot 00 in this example. Here, the IN_USE column 204 is set to 1 at slot 00 before the key and file contents are written to the caching data structure, and is set back to 0 when both the key and file contents have finished writing. In a similar manner, FIG. 2C illustrates caching data structure at a later time still when a third file, "Martha_and_Jen.jpg," is being written to the data structure at slot 11.

As indicated above, the key for a particular data item can be determinative of where the data item is stored in cache structure 200. For example, a mapping function can be applied to the key and output a value that identifies a particular slot of cache structure 200. In the example of FIG. 2A, the mapping function may return the slot 10 and thus the key "JenSmith.jpg" and the corresponding value (file contents) are stored in slot 10. In some implementations, the slot number returned by the mapping function can be considered a logical offset into the cache structure. More generally, the cache structure can be provided as a direct-addressed hash table having a fixed number of slots N, where N is $2^d$ and d is a number of bits. Thus, in the example of FIGS. 2A-2C, N is 4 and d is 2 because there are four slots represented by two bits each.

As one example of a mapping function, a hash function can be used to derive slot addresses from keys. For example, the key "JenSmith.jpg" may hash directly to 10 if a hashing function that outputs two bit hash values is used. If the hashing function outputs longer bit strings, a mapping function that uses a subset of the bit strings can be applied. For example, the mapping function may use a certain number of the least-significant bits from the result of the hash, two bits in the examples of FIGS. 2A-2C.

As mentioned above, the output of the mapping function can be used as an offset into the caching data structure. To generalize, the offset can be the lowest d bits of a hash of the key K using a hash function H. Some implementations can use the formula offset=H(k) & (N−1), where "&" is a bitwise AND operator and N is 2^d. In this implementation, the "&" operator masks the higher-order bits of the return value of the hash function so that they are each set to 0.

Also, note that some implementations may store a hash of the key in the cache structure 200 instead of the key itself. For example, if the key "JenSmith.jpg" hashes to 0010, 0010 can be written to KEY column 202 and used instead of the file name. In this example, 0010 can be determined using the same hash function that determines the offset.

Example Insertion Method

Figure 3:
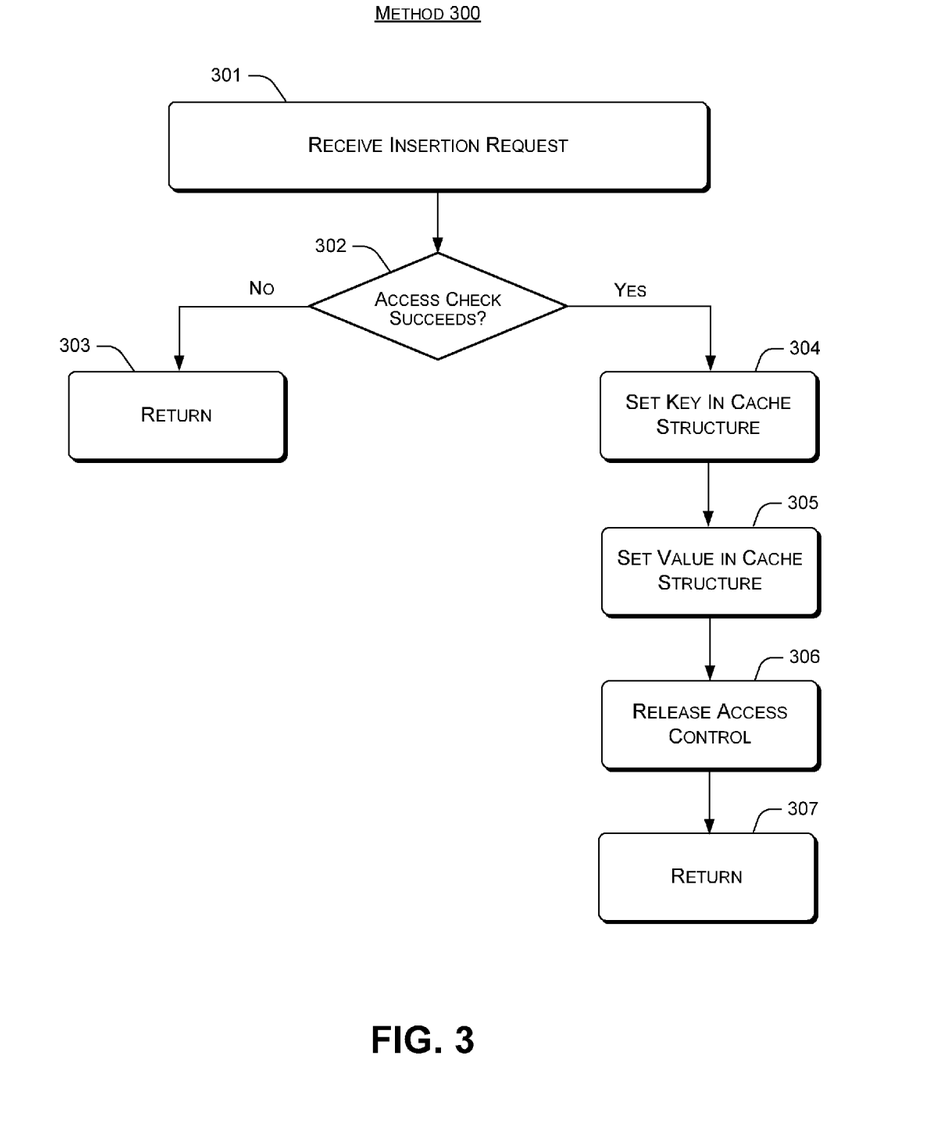
FIGS. 3 and 4 are flowcharts for accomplishing certain concepts in accordance with some implementations.

FIG. 3 shows an insertion method 300 that can be applied to insert data items into cache structure 200. For example, insertion method 300 can be performed by cache module 111 for each picture that application 112 requests to insert into cache structure 200.

At block 301, an insertion request is received. For example, cache module 111 may receive a request to cache a data item. In the example of scenario 100, the request can be received from another module on mobile device 110 such as application 112 that is being used by the user to search for and download photos. In some implementations, the insertion request is provided by a function call with one or more arguments. For example, the arguments can include a key that identifies the data being inserted, the data item itself, etc.

At decision block 302, an access check is performed to determine whether the data item will be inserted into the cache structure. For example, cache module 111 can perform a mapping function as discussed herein to identify a particular slot of the cache structure. The cache module can then check the IN_USE column for identified slot. For example, some implementations can perform a compare and swap operation on the IN_USE column that compares the current value of the IN_USE column to 0, and, if 0, sets the value to 1. As mentioned, operations used to modify the IN_USE column can be atomic to ensure consistency in multi-threaded implementations. For example, in some implementations, compare and swap operations are performed using a single machine instruction, e.g., from an x86 instruction set or another instruction set. Example x86 instructions include "CMPXCHG8B" and "CMXCHG16B" word-level instructions as well as "lock bts" or "lock btc" bit-level instructions. If the access check did not succeed (e.g., the compare operation indicated that IN_USE had a value of 1), the method can return without further processing. For example, the method can return to a calling application or thread that provided the insertion request. In some implementations, insertion method 300 does not provide an indication that the insertion has not been performed, e.g., application 112 may proceed as if the data had actually been inserted into cache structure 200. Note that this does not affect the correctness of the processing by the calling application. Rather, as discussed more below, when the data value is not added to the cache structure, the data value can simply be obtained elsewhere (e.g., by recomputation or other higher-latency source) when needed at a later time.

If the access check succeeds at block 303, e.g., the compare and swap operation set the value of IN_USE for the identified cache slot to 1, the method goes to block 304. At block 304, the key is written to the KEY column 202 of the cache structure 200 at the identified cache slot. Next, at block 205, the data value is written to the VALUE column 203 of the cache structure at the identified cache slot. As discussed more below, subsequent requests to retrieve the data value from the cache structure can use the key to determine whether the data value is present in the cache.

Once the data value has been written to the cache, insertion method 300 can move to block 306, where access control to the cache slot can be released. For example, another compare and swap operation can be performed to set the IN_USE bit back to 0, although some implementations may use non-atomic operations as well and/or omit the compare and simply write a value of 0. Next, insertion method 300 can go to block 307 and return. Note that, in some implementations, blocks 307 and 303 can return to the calling thread/routine identically. As previously mentioned, there is not necessarily a return value that indicates whether the insertion request succeeded or failed. Rather, as mentioned above, proper program behavior does not depend on the success of the insertion operation.

Example Retrieval Method

Figure 4:
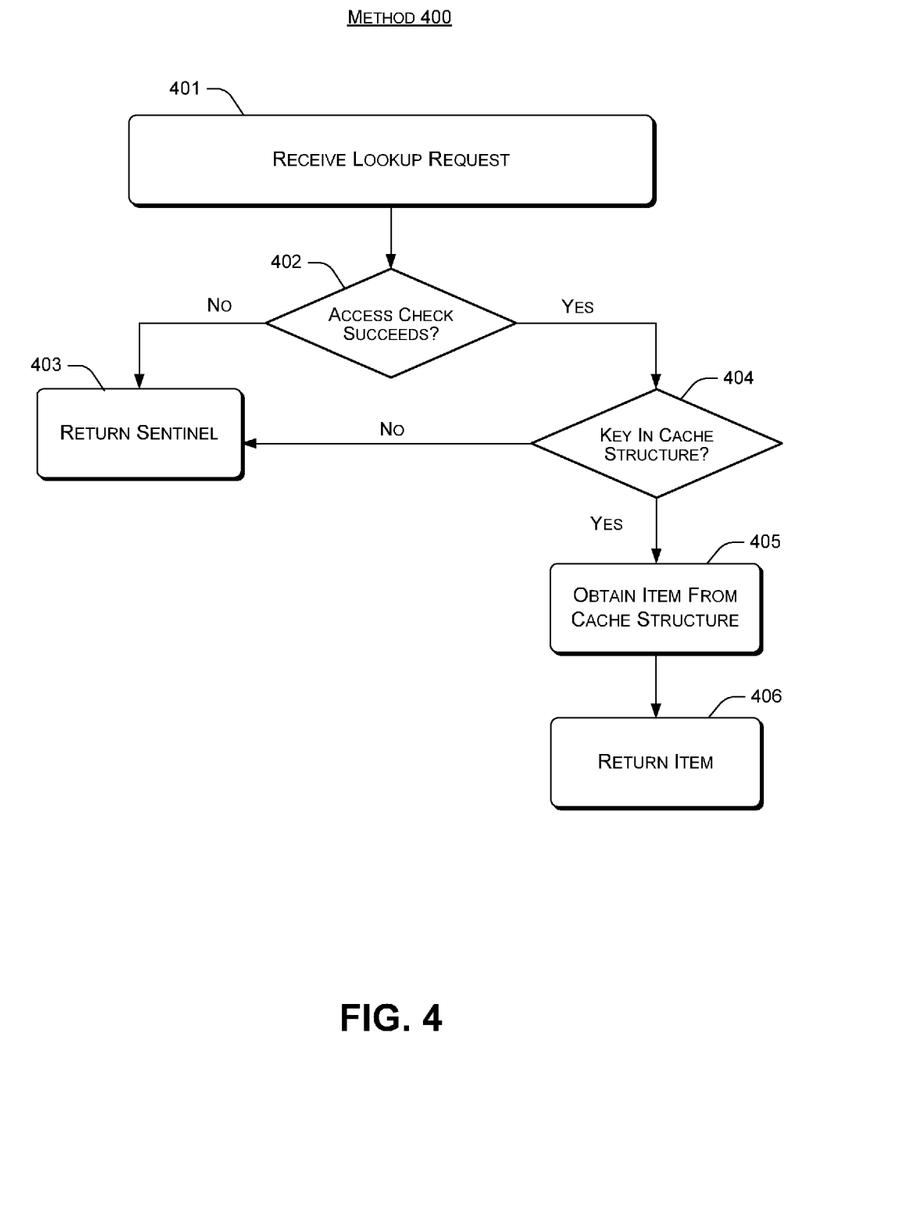

FIG. 4 shows a retrieval method 400 that can be applied to retrieve data items that are stored in the cache structure 200. For example, retrieval method 400 can be performed by cache module 111 to retrieve pictures that have been received previously by mobile device 110 and stored in the cache structure. This can result in a lower-latency response to a user request as discussed above, e.g., instead of re-downloading the pictures from cloud storage.

At block 401, a lookup request is received. For example, cache module 111 may receive, from application 112, a request to look up a particular data item such as the file "JenSmith.jpg." In some implementations, the request is provided by a function call with one or more arguments. For example, the arguments can include an identifier of the data being written, e.g., the key for the file "JenSmith.jpg." As mentioned above, the key can be an identifier of the file such as the file name, a database key, or other suitable identifier to distinguish the file from other data items in the cache structure.

At decision block 402, an access check is performed to determine whether the appropriate cache slot for the data item is available. As discussed above, cache module 111 can perform a mapping function to identify the particular slot where "JenSmith.jpg" would be stored if present in the caching data structure. The access check can be performed for the slot using a compare and swap instruction or other atomic operation to ensure cache consistency. The compare and swap instruction can use a single machine instruction that checks whether the IN_USE bit is set to 0, and, if so, sets the bit to 1. If the access check fails, retrieval method 400 can proceed to block 403, where a sentinel value is returned from the method. The sentinel value can be a predetermined value, e.g., "NULL," indicating that the requested data item is not available. Other techniques can be used besides returning a sentinel value, e.g., setting a global flag, modifying an argument passed by reference, returning a Boolean FALSE value, etc. Calling applications/threads such as application 112 may implement appropriate processing to handle this situation, e.g., recomputing the requested data, obtaining the data from a higher-latency source (e.g., download the picture again), etc.

If the access check succeeds, retrieval method 400 can continue to decision block 404. At decision block 404, a check is made to determine whether the data item is present in the cache structure. For example, the cache slot that the key maps to can be checked to see whether the KEY column 202 is equal to the key received as an argument. Continuing with the example above, block 404 can include checking whether the KEY column is equal to "JenSmith.jpg."

If there is agreement between the KEY column 202 and the key argument, the method can proceed to block 405, where the item is obtained from the cache structure. For example, the file contents of "JenSmith.jpg" can be retrieved from the cache structure. At block 406, the contents can be returned, e.g., to the calling application/thread.

If, instead, there is no agreement between the key field in the cache structure and the received key argument, this indicates that the data in the cache structure 200 is not the data item requested by the caller, or that the particular cache slot is empty. In this case, the method proceeds to block 403 and a sentinel value is returned.

Insertion Pseudocode

Figure 5A:
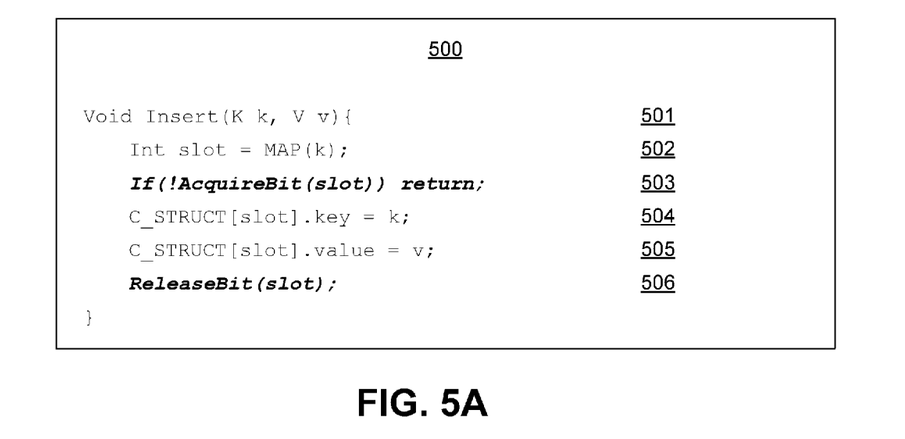
FIGS. 5A and 5B show exemplary pseudocode for accomplishing certain concepts in accordance with some implementations.

FIG. 5A includes a pseudocode example of an Insert routine 500 that can be used to implement insertion method 300. For example, Insert routine 500 can be performed responsive to insertion requests received from application 112. The following discussion maps various functionality of Insert routine 500 to corresponding steps of insertion method 300. However, various other coding implementations are consistent with the data insertion concepts discussed herein. For clarity, certain code lines are shown in FIG. 5A in bold italics because these code lines are used for concurrency control and thus may be discarded in implementations where concurrency control is not used, e.g., single-threaded implementations.

In the following pseudocode examples, the cache structure 200 is referred to in pseudocode as an object C_STRUCT having members corresponding to the columns of the cache structure. Specifically, C_STRUCT has a member "key" corresponding to KEY column 202, a member "value" corresponding to VALUE column 203, and can also have a member in_use corresponding to IN_USE column 204.

Insert routine 500 includes a line 501 with a function return type (Void), a function name (Insert), and two function arguments, a key k of data type K and a value v of data type V. As mentioned above, the data type of the key K can be an integer, file name (e.g., string data type), or other data type suitable for distinguishing individual data items from one another. The value data type V depends on the type of data being stored in the cache structure, e.g., in the examples discussed above V can be an image file type such as the contents of a .jpg file.

When Insert routine 500 is called by application 112, e.g., corresponding to block 301 of insertion method 300, the aforementioned arguments are received from the application. Next, line 502 performs a MAP function as mentioned above to determine an offset into cache structure 200. The offset can be stored in an integer variable "slot" that represents the particular cache slot where the data can be inserted.

Next, at line 503, the routine AcquireBit is called to determine whether the IN_USE column can be acquired for the cache slot determined at line 502. For example, AcquireBit can check C_STRUCT[slot].in_use and, if the bit is 0, set the bit to 1. The AcquireBit routine can be implemented as a routine that returns a Boolean value indicating whether the bit is acquired. Thus, line 503 be used to implement block 302 of insertion method 300, e.g., performing an access check. As previously mentioned, AcquireBit can be implemented using a single instruction compare-and-swap to set IN_USE to a value of 1.

If the IN_USE column cannot be acquired, e.g., the value of IN_USE at the cache slot is already set to 1, the method returns without further processing. Thus, the "return" logic in line 503 can be used to implement block 303 of insertion method 300.

If the IN_USE column can be acquired, e.g., the value of IN_USE for the determined cache slot is set to 0, then processing proceeds as follows. As mentioned above, the compare and swap instruction can be used so that the IN_USE column is set to 1.Next, processing proceeds to line 504, where C_STRUCT is populated with the key value K at the determined slot. Thus, line 504 can implement block 304 of insertion method 300, setting the key in the cache structure. Next, processing proceeds to line 505, where C_STRUCT is populated with the value V at the determined slot. Thus, line 505 can implement block 304 of insertion method 300, setting the value in the cache structure.

Next, at line 506, the IN_USE field is released, e.g., set to 0 by the routine ReleaseBit. As discussed above with respect to the routine AcquireBit, ReleaseBit can also be implemented using a single instruction that compares and swaps, e.g., if IN_USE is set to 1, it is set to 0 by a compare and swap operation or other operation that sets IN_USE to 0. At this point, other operations (e.g., other threads) can read from/write to this slot of cache structure 200. Note also that ReleaseBit can be implemented as a void routine that does not return a value.

Retrieval Pseudocode

Figure 5B:
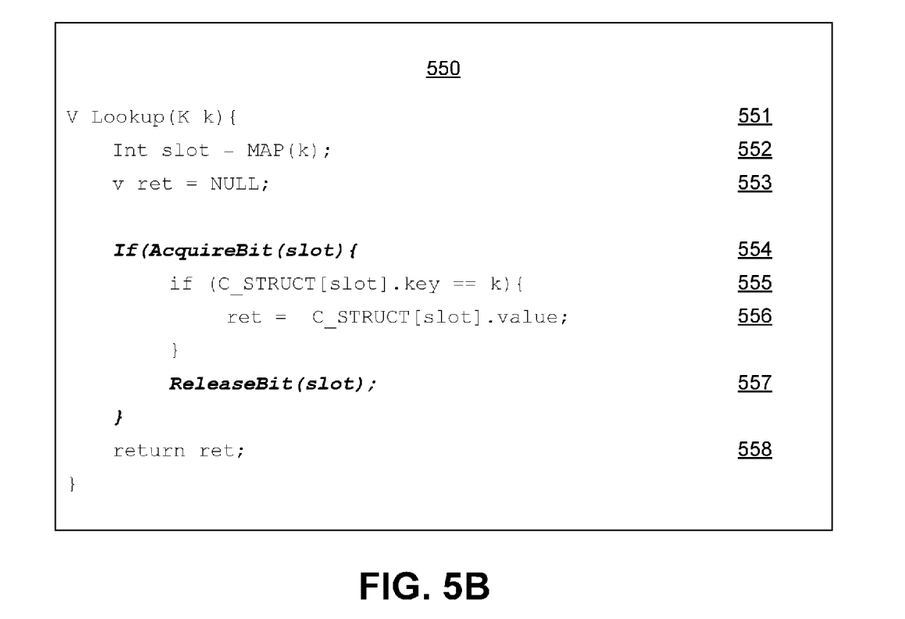

FIG. 5B includes a pseudocode example of a Lookup routine 550 that can implement retrieval method 400. For example, Lookup routine 550 can be performed responsive to lookup requests received from application 112. The following discussion maps various functionality of Lookup routine 550 to corresponding steps of retrieval method 400. However, various other coding implementations are consistent with the data lookup concepts discussed herein. As with FIG. 5A, certain code lines are shown in FIG. 5B in bold italics because these code lines are used for concurrency control and thus may be discarded in implementations where concurrency control is not used, e.g., single-threaded implementations.

Lookup routine 550 includes a line 551 with a function return type V, a function name Lookup, and a function argument of type K. As discussed above with respect to Insert routine 500, V is the data type of the data values that are inserted into the cache structure and K is the data type of the keys used to distinguish between different data values.

When Lookup routine 550 is called by application 112, e.g., corresponding to block 401 of retrieval method 400, the aforementioned arguments are received from the application. Next, line 552 performs a map function to populate an integer variable named "slot" as discussed previously, e.g., with respect to line 502 of Insert routine 500. The integer slot can be used to refer to a particular cache slot where the key k is located in cache structure 200, if currently stored therein. Next, a variable "ret" of type v is set to "NULL" as a sentinel value at line 553.

At line 554, an AcquireBit operation can be performed as mentioned above in a first "if" statement that evaluates to either 1 or 0.A value of 1 indicates the IN_USE bit at [slot] was 0 before AcquireBit was called and has been set to 1, and thus indicates that the determined cache slot is available for use by the caller. In other words, the Boolean return value of AcquireBit indicates the compare and swap operation succeeded. A return value of 0 indicates that the IN_USE bit at [slot] was 1 and the determined cache slot is not currently available, e.g., the compare and swap operation did not succeed. Thus, line 554 can correspond to block 402 of method 400, e.g., performing an access check.

If the AcquireBit operation at line 554 does not succeed, lines 555-557 are skipped and the NULL value is returned to the caller at line 558. The NULL value indicates that the requested value has not been retrieved from the cache structure. Thus, when the variable ret has a value of NULL, line 558 can implement block 403 of method 400, e.g., returning a sentinel value.

If the AcquireBit operation at line 554 does succeed, line 555 executes. Line 555 includes a second "if" statement that compares the key in the cache structure (C_STRUCT[slot].key) to the input argument k. If there is a match, the second "if" statement evaluates to true and otherwise evaluates to false. Thus, line 555 can implement block 404 of method 400, e.g., determining whether the key is in the cache structure.

If the second "if" statement evaluates to false, a ReleaseBit operation is performed at line 557 to set IN_USE to 0. Since the variable "ret" has not been modified, line 558 will return a value of NULL, again corresponding to block 403 of method 400.

If the second "if" statement evaluates to true, line 556 obtains the value from the cache structure 200 at the appropriate slot, e.g., C_STRUCT[slot].value is set to the value of the variable "ret." Setting the value of the variable "ret" at line 556 can correspond to block 405 of method 400, e.g., obtaining the item from the cache structure.

Next, line 557 releases the IN_USE bit at [slot] so that other operations (e.g., other threads) can read from or write to that slot of the cache structure 200. Next, line 558 returns the variable "ret" in response to the function call. Since the variable "ret" is populated with the requested data item at line 556, line 558 can be used to implement block 406 of method 400 in instances when line 556 executes.

Single Thread Implementations

As previously mentioned, some implementations may not use a concurrency control mechanism, e.g., single-threaded implementations may not necessarily benefit from concurrency control. In such implementations, certain blocks of methods 300 and 400 and corresponding language of routines 500 and 550 can be omitted. In the case of insertion, decision block 302 and block 303 are not performed, and thus each insertion request can proceed to insert the data value into the cache structure 200. Likewise, bolded/underlined code in Insert routine 500 is not performed, e.g., lines 503 and 506. For retrieval method 400, decision block 402 is not performed for similar reasons. Likewise, bolded/underlined code in Lookup routine 550, e.g., lines 554 and 557, can be omitted in implementations that do not use concurrency control.

One reason that single-threaded implementations may benefit from removing the aforementioned instructions is that these instructions may incur a slight penalty due to the compare and swap operations (AcquireBit and ReleaseBit or equivalent word-level operations). This is partly due to the direct overhead of executing the instructions themselves, and also due to the fact that some processors may prohibit instruction reordering around compare and swap operations to ensure data consistency.

Multithreaded Examples

As previously mentioned, simultaneous access to an individual cache slot by two threads can result in inconsistencies. Thus, atomic read and write operations can be used to access the cache. Otherwise, the cache can be corrupted by multiple threads trying to access the same cache slot concurrently.

For example, if a first thread is reading from a cache slot while a second thread is writing to the cache slot, the first thread may or may not read the data written by the second thread, depending on the order in which individual instructions of the threads take place. As another example, if the two threads are attempting to insert two different data items into the cache structure with keys that both map to the same cache slot, it is possible for that cache slot to enter a state where the key written by the first thread is in the cache slot with the value written by the second thread. Thus, the next thread to read the cache slot can retrieve a data value from the cache slot that does not match the key written at the cache slot.

As introduced above, the disclosed implementations protect slots from concurrent access using the IN_USE column, which provides a bit array for each slot of the cache structure. Recall that a single compare-and-swap machine instruction can be used to determine whether a slot is in use (and to lock the slot if the slot is not in use). This is a relatively lightweight approach in the sense that the bits themselves take up relatively little space. Furthermore, the disclosed implementations can protect portions of the cache structure at a relatively fine level of granularity, e.g., individual cache slots can be separately protected.

Some approaches to concurrency control may use blocking behavior where threads wait for locks before continuing processing. Note that the disclosed implementations can allow threads to implement non-blocking behavior while still providing protected access to individual cache slots. Considering the examples set forth above, note that insert requests can be ignored, e.g., block 303 of insertion method 300 returns without inserting the data item when the access check fails. This, in turn, means that the calling thread can continue processing as if the data item had been inserted. As mentioned above, this does not affect correctness of the operation of the calling thread (or other threads). Rather, subsequent attempts to retrieve the data item from the cache structure can simply proceed as if the data item were actually inserted and had been subsequently overwritten. In other words, subsequent attempts to retrieve the data item may fail, but this only means that the data items have to be recomputed or otherwise obtained from a higher-latency source—not that an incorrect value is used.

Also, note that some implementations allow for a "false negative." When a given slot is in use, calls to read from that slot can return false irrespective of whether the key is actually in that cache slot. This is apparent from the path from decision block 402 to block 403 of retrieval method 400, where the failure of the access check means the sentinel value of "null" is returned before the cache slot is even checked for the key. The worst case scenario here is that the calling thread simply recomputes the value or obtains the value from a higher-latency source when the value was actually available in the cache structure but protected from access by the IN_USE bit.

Thus, in some disclosed implementations, the calling thread does not need to block when the thread cannot obtain access control over a cache slot. This can be the case irrespective of whether the calling thread is reading or writing from the cache structure. If the thread is attempting to write to a cache slot that is currently being used by another thread, the thread simply continues as if the data were actually written instead of blocking and waiting for the other thread to release a lock. Similarly, if the thread is trying to read from an occupied cache slot, the thread continues processing and simply obtains the value from a source other than the cache structure (e.g., recompute, higher-latency source, etc.) and continues without blocking. Furthermore, calling threads are freed from the overhead of managing locks for access control.

In some contexts, the use of slot-by-slot contention detection as discussed herein can reduce the likelihood of actual contention for any individual slot. For example, an implementation where a single lock is used for the entire cache is much more likely to have contention between any two threads, because all cache accesses require the lock. Performing contention detection at finer levels of granularity can reduce the likelihood of contention, e.g., if a cache is divided in half and each half has a lock, it is less likely that two threads will concurrently try to access the same half of the cache. This is relevant to the present implementations because contention is generally reduced when cache slots are protected on an individual basis. Also, note that increasing the cache size (e.g., doubling) also tends to reduce the likelihood for contention since there are more individually-protected slots available for data.

As mentioned above, some implementations allow for a "false negative" state where a read attempt fails because of access control even though the key provided in the read attempt is present in the cache. The expected false negative rate for a lookup can be computed using:

$$P(\text{thread in cache}) = \text{cache time}/\text{cache time} + \text{noncache time}$$

$$\text{False negative rate} = (\text{\# of threads} - 1) * P(\text{thread in cache})/\text{number of slots in cache}$$

Here, P(thread in cache) represents the probability of a thread getting access control on any given read or write. Cache time represents the time for lookup or insert operations, and noncache time represents the rest of the time the program is executing. Also, note that some write requests are ignored and thus some recently-computed data is not present in the cache. Both false negatives and ignored write requests can cause the hit rate for the cache to be somewhat lower than in a pure locking implementation where threads block and wait to complete their insert/read operations. This lower hit rate can be a characteristic of implementations that exhibit "cache recency." Cache recency describes a situation where data items that have been written to the cache structure more recently tend to be looked up more than older data items.

Fingerprint Implementations

Figure 6A:
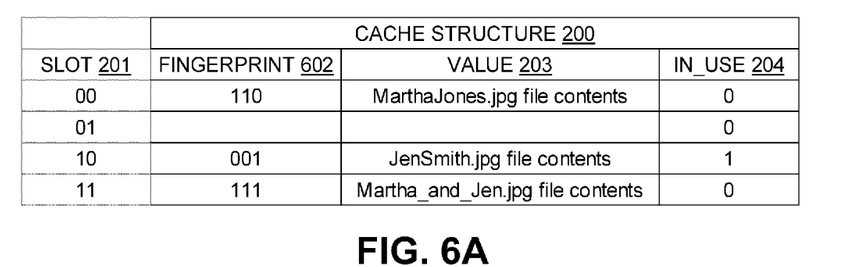
Figure 6B:
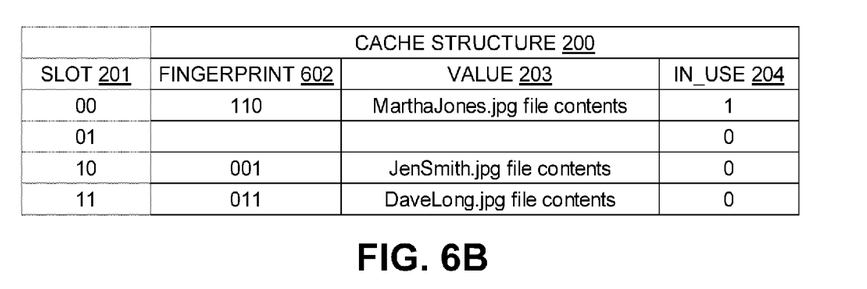

In the examples discussed previously, data items were identified in the cache structure by identifiers such as the key itself or a hash of the key. Further implementations, such as shown in FIGS. 6A-6B may use a fingerprint to identify individual data items in the data structure. For example, the fingerprint for a given data item can be part of the hash of the key.

Considering FIG. 6A, note that cache structure is shown as including a FINGERPRINT column 602 instead of KEY column 202. The fingerprints for each data item can be obtained from the high order bits of a hash of the key. As discussed previously, the low order bits can determine the cache slot where the data item is stored. FIG. 6A shows the fingerprint for "MarthaJones.jpg" as 110, and thus the high order bits for the hash of the key (e.g., file name, database key, etc.) are 110. Since MarthaJones.jpg is stored in cache slot 00, it follows that 00 are the low order bits of the hash. Thus, the complete hash for the key "MarthaJones.jpg" could be 11000 if the entire hash is used for the fingerprint and cache slot. Continuing with the examples in FIG. 6A, the complete hash for "JenSmith.jpg" could be 00110, and the complete hash for Martha_and_Jen.jpg could be 11111. Note, however, that this is one example of how bits of the hash can be used for the fingerprint and cache slot. In other implementations, lower-order bits can be used for the fingerprint and high-order bits for the cache slot. Other variations are possible provided distinct (e.g., mutually exclusive, nonoverlapping) bits are used for the cache slot and the cache fingerprint.

The fingerprint can be used in a manner similar to the key/key hash in the examples discussed above for both insertion and retrieval operations. Considering insertion operations first, assume a request is received to insert a file named "DaveLong.jpg" into the cache. Further assume that the key "DaveLong.jpg" hashes to 01111. Since the low order bits are 11, the cache module 111 can check cache slot 11 to determine if this slot is available. If the access check succeeds, the fingerprint 011 can be set in the cache structure at block 303 as shown in FIG. 6B.

Note also that Insert routine 500 can be modified to determine the fingerprint and write the fingerprint to the fingerprint column at line 504. One example implementation could be to pass, by reference, an integer "slot" and another integer "fingerprint" to the map routine while passing the key by value, e.g., void MAP(K k, int &slot, int &fingerprint). The map routine can modify the integer variable slot to equal the low order bits of the hash of the key and can modify the integer variable fingerprint to equal the high order bits of the hash of the key. In such implementations, a single computation of the hash can be used to populate both variables. The integer variable fingerprint can then be used at line 504, e.g., C_STRUCT[slot].fingerprint=fingerprint.

Now consider a retrieval operation for DaveLong.jpg using retrieval method 400. Blocks 401 and 402 of retrieval method 400 can proceed as discussed above, and if access control fails the method can return at block 403. If access control succeeds, the fingerprint instead of the full key can be checked at decision block 404. If the fingerprint does not match, the method returns at block 403. If the fingerprint does match, DaveLong.jpg is retrieved from the cache and returned to the caller.

Lookup routine 550 can likewise be modified to accommodate fingerprint implementations as follows. Map routine can be implemented as discussed above to modify an integer variable slot and another integer variable fingerprint. At line 553, the second comparison operation can be rewritten as C_STRUCT[slot].fingerprint ==fingerprint.

Note that some implementations using fingerprints may result in "false positives." Because the key itself is not checked directly, there is some chance that two different data items mapping to the same cache slot can also have the same fingerprint. The likelihood of this occurring is related to the size of the fingerprint, e.g., larger fingerprints tend to reduce the likelihood of two data items having both the same key and fingerprint. For a random hash function, the probability of a false positive for a fingerprint of d bits can be represented as $1/(2^d)$.

Considering the example above, assume a retrieval request for "Rex_and_Maggie.jpg" is received. Further assume that the low order bits of the hash are 11 and the high order bits of the hash are 011.In this context, Rex_and_Maggie.jpg is indistinguishable from DaveLong.jpg and DaveLong.jpg will be returned in response to the request.

Note also that some implementations may use hash functions that return more total bits than the number of bits used collectively by the fingerprint and slot address. For example, an 8-bit hash function could be used where the full hash for Rex_and_Maggie.jpg is 01100011 and the full hash for DaveLong.jpg is 01111111 and the underlined bits are not part of hash or slot addressing scheme. Although the full hash values differ for the two files, the false positive still occurs in this case because the distinguishing bits are not used for either slot addressing or the fingerprint. Also note that the map routine can be implemented by bit masking to obtain both the slot address and fingerprint, for this example a logical AND operation with 11100000 followed by a 5-bit shift to the right can be used to obtain the fingerprint, and a logical AND operation with 00000011 can be used to obtain the slot address.

Alternatively, a modulus function can be used to determine the slot, e.g., the hash mod the size of the hash table. Generally, mod operations involve a division which can be slower than bitwise operations. Thus, it can be useful to explicitly code the slot mask rather than relying on compiler optimization of a mod operation. Alternatively, some implementations may rely on compiler optimization by providing the size of the cache structure 200 to the compiler, and the compiler can replace the mod operation with bitwise operations when the cache structure size is a power of 2.

In some implementations, the number of bits dedicated to the slot address can be a function of the size of the cache. On the other hand, for any given cache size, arbitrary fingerprint sizes can be used depending on how important it is to minimize or reduce the number of false positives. Thus, implementations that choose a relatively lightweight (small) fingerprint tend to accept more frequent false positives.

Configuration Interfaces

Figure 7A:
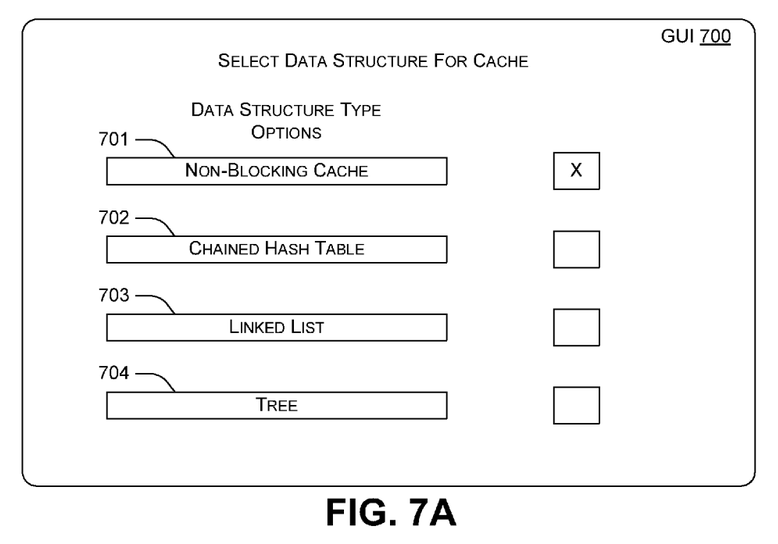
FIGS. 7A and 7B show exemplary screenshots of graphical user interfaces that can be provided in accordance with some implementations.

Some implementations may provide various facilities for creating and/or configuring a cache in accordance with the disclosed implementations. FIG. 7A illustrates a graphical user interface ("GUI") 700 that allows a user to select a type of data structure to use for caching data. For example, GUI 700 can be presented to a developer that wishes to create a cache for a particular application, e.g., a development environment for creating the aforementioned imaging application, or for an individual configuring a remote caching service. Here, the developer is given options of configuring the application including non-blocking cache option 701, a chained hash table option 702, a linked list 703 option, or a tree option 704. In FIG. 7A, the developer has selected non-blocking cache option 701.

Figure 7B:
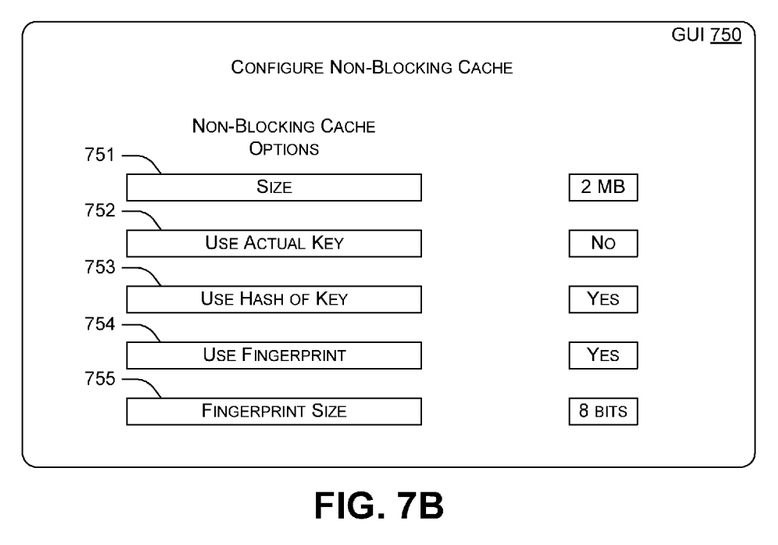

FIG. 7B illustrates an exemplary GUI 750 that can be used to configure a non-blocking cache. For example, GUI 750 can be presented to the developer in response to the selection of non-blocking cache option 701 in GUI 700. The developer can be given options to configure various traits of the non-blocking cache, including size option 751. Here, the developer has selected to create a 2 megabyte non-blocking cache.

The developer is also given the option to configure whether to use the actual key values (e.g., file names, database keys, etc.) or hashes of key values by selecting either the use actual key option 752 or the use hash of key option 753. Here, the developer has chosen to use hashes of key values in the cache structure, so the developer is also given the choice to use a fingerprint and set a fingerprint size via use fingerprint option 754 and fingerprint size option 755. Here, the developer has opted to configure the cache to use an 8-bit fingerprint.

Note that GUIs 700 and 750 as presented above are exemplary in nature and various other forms of interfaces, both graphical and non-graphical, can be used to configure cache processing in accordance with the disclosed implementations. As another example, some implementations can provide application programming interfaces ("APIs") that define functions for creating cache structures and configuring cache functionality as set forth herein. For example, a function to create a cache structure can include parameters to set the size of the cache, size of the fingerprint (if any), hash function to use (e.g., a particular technique and/or size of the hash), etc.

Design Considerations

Caching strategies can be implementation-dependent, e.g., certain strategies may be more or less appropriate depending on the specific environment in which a cache is implemented. Compare a first system where a cache miss results in a local, in-memory recomputation that takes, on average, twice as long as reading from the cache. Now, consider a second system where a cache miss results in a disk access followed by a network send operation, a remote computation (server latency), and a network receive operation where these operations collectively take, on average, 100 times longer than reading from the cache. The first system may be more well-suited for the disclosed implementations because of the relatively low penalty for the cache miss. This is because the false negative lookup scenario mentioned previously has relatively less impact in the first system than in the second system. In the second system, it may be worthwhile to allow threads to block and wait to read from the cache rather than perform the disc/network operations. In the first system, it may be more efficient for the thread to continue processing and go ahead with the recomputation.

Another characteristic of systems that may benefit from the disclosed implementations include systems where false negative rates are expected to be relatively low. Consider an example with a data space of 2000 distinct values, where 90% of the reads/writes in the system involve a subset of only 700 of these values. In other words, the distribution of data has a relatively high concentration of 700 values that get looked up frequently, and a relatively long "tail" of 1300 values that get looked up infrequently. A cache with 1 k cache slots (e.g., 1028) is large enough to encompass all of the high-frequency values. Thus, the percentage of false negatives is likely to be relatively low because of the distribution of the data and the size of the cache. Note that hash functions can effectively randomize the storage locations of data items in the cache, which helps reduce the likelihood that two threads will concurrently ask for the same cache slot. That said, particular data items with very high frequency of access are more likely to result in contention for an individual cache slot.

Cache structure sizing is another relevant design consideration. As suggested above, it can be helpful to size the cache structure such that most or all data items that exhibit high access frequency can fit into the cache structure. Furthermore, note that hardware considerations can also come into play when considering cache sizing. Generally, it can be helpful to size the cache structure so that the entire cache structure (keys/fingerprints, data, access bit) can fit into a lower-latency layer of a given memory hierarchy. Thus, for example, it may be useful to size the cache structure to fit into an L2 cache on a given processor instead of providing a larger cache structure that would need to be partially stored in an L3 cache or in RAM. This can reduce the number of L3 or RAM access in the system. This concept is extensible to other layers of a memory hierarchy depending on the specific implementation, e.g., sizing a cache structure to fit into RAM to avoid needing to perform disk accesses, etc. Also, note that there can be some benefit to sizing the individual cache slots so that a single cache slot can be read as a single memory page because it can be relatively inefficient to use multiple paging (disk I/O) operations to populate a single cache slot.

To the extent that additional low-latency memory is available, it can be worthwhile to increase the number of slots of the cache structure, e.g., as long as increasing the size will not cause the cache to spill over into a slower level of the memory hierarchy. This is because doubling the number of cache slots allows the key space to double as well, which in turn reduces the likelihood of a false negative. To the extent that memory is available, this may be a worthwhile trade-off relative to other implementations such as blocking or thread-local caching.

Also note that the disclosed implementations may provide relatively consistent time cache lookup operations or even performance guarantees. This is true because of the non-blocking behavior, e.g., when a cache read is performed, the operation returns to the calling thread even if access control cannot be obtained. In contrast, blocking implementations often tend to exhibit inconsistent cache lookup times because thread blocking times can vary greatly from one cache operation to another. The disclosed implementations can also be distinguished from techniques that create variable-sized hash tables by chaining data items together, e.g., when multiple items are added that map to a single location in the cache. This, in turn, can result in variable cache seek times, whereas the disclosed implementations may provide relatively consistent cache seek times, e.g., by storing only a single data item in each cache slot. Thus, the disclosed implementations may be suitable for situations where bounded times for caching operations are desirable, e.g., real-time processing.

One issue to keep in mind in designing a cache using the disclosed implementations is that variable-sized data values can result in cache fragmentation. To the extent there are reasonable bounds on the data size (or the size of the cache is not constrained by available memory or hardware cache), using the caching techniques disclosed herein will result in unreasonable amounts of cache fragmentation. For example, in scenario 100, if each of the images is of a relatively similar size (e.g., between 30 and 40 Kb), fragmentation is not that wasteful because each cache slot can be sized to accommodate 40 Kb worth of data for a worst-case of 10 Kb of wasted memory per cache slot. However, if images range from 10 Kb to 1,000 Kb, it may not be reasonable to adopt this approach, e.g., the worst case here is 990 Kb of wasted memory in a single cache slot, e.g., 99%. In implementations with variable data sizes, it can be useful to implement a level of indirection by caching a memory offset and length that identifies where the requested data is stored in the cache structure, instead of directly storing the data in the cache structure. This allows for uniform sizing of the items in the cache structure and alleviates the fragmentation issue.

Another design consideration relates to what size data units are used for the IN_USE column 204 of the cache structure 200. As mentioned, word-level operations can be faster in some architectures than bit-level operations. On the other hand, using relatively fewer bits for the IN_USE column can result in a lower memory footprint for the cache structure. When the data items are relatively large, the IN_USE column is likely to represent a relatively small portion of the overall size of the cache structure, and thus using words for access control may be appropriate. Conversely, if the data items are relatively small, the IN_USE column is a larger portion of the overall size of the cache structure and using individual bits for access control may be more appropriate. This decision can also be informed by the extent to which using relatively smaller data units for access control influences whether the cache structure will fit into lower-latency levels of a memory hierarchy, e.g., an L2 cache as opposed to main memory.

Example System

Figure 8:
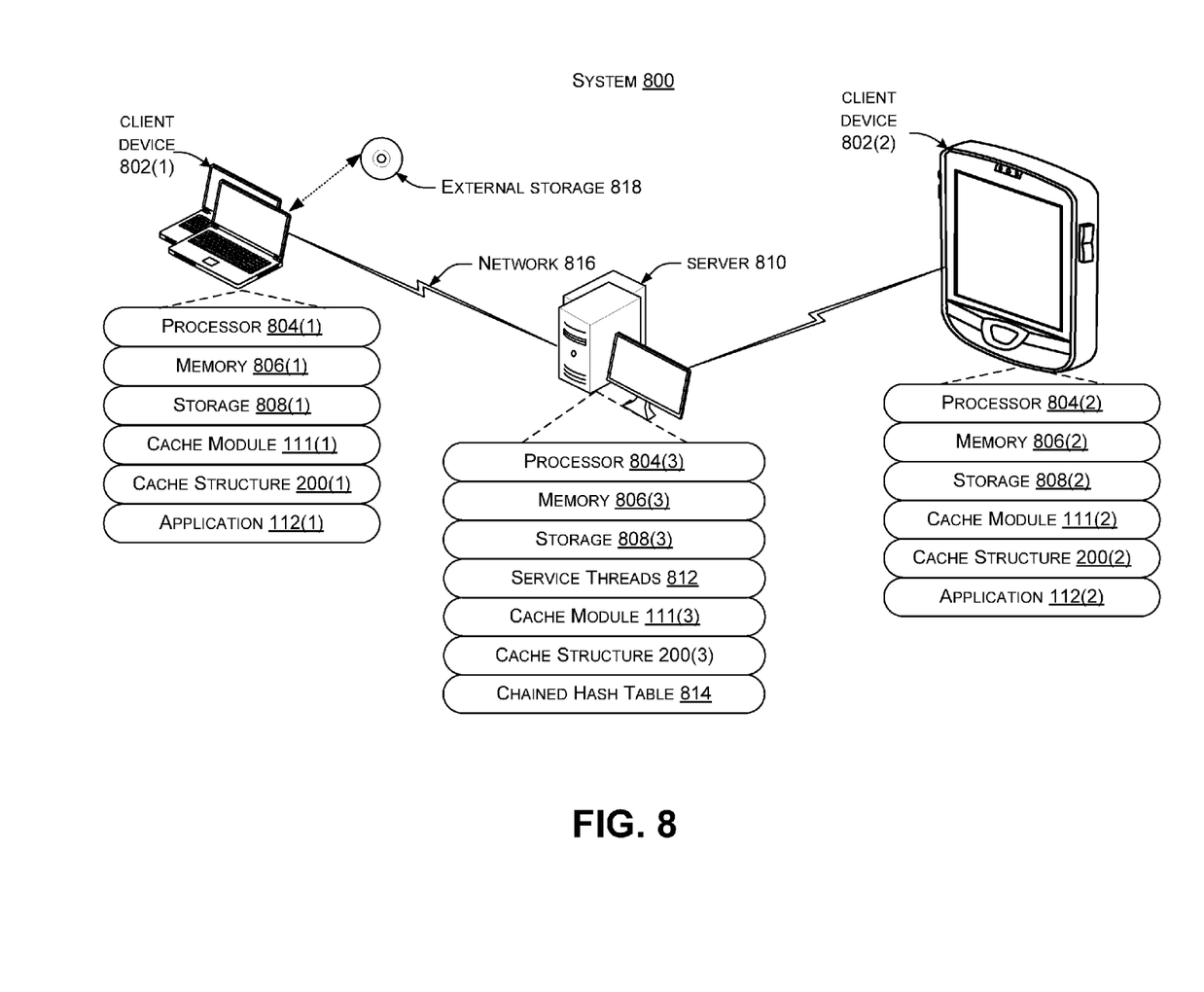
FIG. 8 shows an example system that can be configured to accomplish certain concepts in accordance with some implementations.

FIG. 8 shows an example of a system 800 where caching techniques such as those discussed above can be performed on a server that provides a caching service for multiple client devices. Example system 800 includes one or more client device(s) 802, shown as a notebook client device 802(1) and a mobile client device 802(2), respectively. In this case, client device(s) 802 can each include a processor 804, memory 806, storage 808, cache module 111, cache structure 200, and application 112. Note the suffix '(1)' is utilized to indicate an occurrence of components on client device 802(1) and a suffix '(2)' is utilized to indicate an occurrence of such components on client device 802(2)). As mentioned above, application 112 can be a computing application, such the aforementioned cloud-enabled application.

System 800 can also include one or more server(s) 810. Server 810 can be a computing device that also includes a processor 804(3), memory 806(3), storage 808(3), cache module 111(3), cache structure 200(3), and chained hash table 814. Note the suffix (3) is used to indicate an occurrence of a given component on server 810. Certain processing discussed above with respect to FIGS. 1-7 can also be performed by cache module 111 resident on server 810.

Client device(s) 802 and server 810 can communicate over one or more networks 816, such as, but not limited to, the Internet. Cache module 111 can be implemented as software, hardware, and/or firmware. Processor(s) 804 can execute computer-readable instructions to provide any of the functionality discussed herein, e.g., methods 300 and/or 400 and associated processing. Data and/or computer-readable instructions can be stored on memory 806 and/or storage 808. The memory and storage can include any one or more of volatile or non-volatile memory, hard drives, and/or optical storage devices (e.g., CDs, DVDs etc.), among others.

Client device(s) 802 and server 810 can also be configured to receive and/or generate computer-readable instructions from an external storage 818. Examples of external storage 818 can include optical storage devices (e.g., CDs, DVDs etc.), hard drives, and flash storage devices (e.g., memory sticks or memory cards), among others. In some cases, the cache module 111 discussed herein can be installed on the client devices or server during assembly or at least prior to delivery to the user. In other scenarios, cache module 111 can be installed by the user after delivery, such as a download available over network 816 and/or from external storage 818. Cache module 111 can be manifest as a freestanding or service, an application module, and/or part of the computing device's operating system.

The cache module 111 discussed herein can achieve the functionality described above relative to FIGS. 1-7. Specifically, cache module 111 can be configured to perform methods 300 and/or 400 and the associated processing described herein. From one perspective, the cache module can be viewed as ignoring certain requests provided by calling applications or threads. For example, the cache module can ignore an insertion request by not fulfilling the insertion request, e.g., when the appropriate slot is not available. Similarly, the cache module can ignore a lookup request by not fulfilling the lookup request when the appropriate slot is not available. As a consequence, the calling application or thread can proceed without blocking irrespective of whether the cache module fulfilled a particular request.

It is worth noting that in some instances, the client devices or servers can comprise multiple computing devices or machines, such as in a distributed environment. In such a configuration, methods 300 and/or 400 can be implemented using distributed processing across the multiple computing devices or machines.

The terms "computer," "client device," "server" and "computing device" as used herein can mean any type of device that has some amount of processing capability and/or storage capability. Generally, a "mobile device" refers to a computing device embodied in a form factor suitable for a user to carry on their person. A computing device can obtain computer-readable instructions that are stored on storage and/or memory devices. The storage and/or memory devices can be internal and/or external to the computing device. The storage and/or memory devices can include any one or more of volatile or non-volatile memory, hard drives, flash storage devices, and/or optical storage devices (e.g., CDs, DVDs etc.), among others. Also, note that the term "system" can refer to a single device or multiple devices. Such devices can include various input/output mechanisms such as keyboards, displays, touchscreens (e.g., typing and/or gesture inputs), voice-activated interfaces, etc.

As used herein, the term "computer-readable media" can include signals. In contrast, the term "computer-readable storage media" excludes pure signals. Computer-readable storage media includes "computer-readable storage devices." Examples of computer-readable storage devices include volatile storage media, such as RAM, and non-volatile storage media, such as hard drives, optical discs, and flash memory, among others.

In addition to the illustrated configurations of FIG. 8, computing devices consistent with the disclosed implementations can employ a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to controllers, microcontrollers, processor cores, or other types of processing devices suitable for implementation both in conventional computing architectures as well as SOC designs.

Network Caching Service

FIG. 8 illustrates that cache module 111 can be implemented on various different devices. In the examples set forth previously, a local instance of cache module 111 and cache structure 200 were used to store images for later use on an individual client device. In other implementations, server 810 can provide a network caching service to client devices 802. In the following examples, application 112 uses the remote caching service via cache module 111(3) instead of using the local instances of the cache module. Thus, the following example also applies to instances where the client devices do not have their own local cache module or cache structure.

Consider an implementation where application 112 on client devices 802 uses a very large set of data, e.g., 100 gigabytes of data items. For the purposes of the following discussion, application 112 can be a natural language processing application that uses probabilities of certain n-gram strings appearing in a given document. Each time application 112 requests a probability for a particular n-gram, a corresponding service thread 812 is initiated on server 810 to honor the request.

Chained hash table 814 can include keys for all of the n-gram strings and corresponding probabilities, and a subset of keys (or fingerprints) and corresponding probabilities can be stored in cache structure 200(3) by cache module 111(3). Each service thread can first attempt to retrieve a requested n-gram/probability pair from the cache module via a lookup request. If this fails, the service thread can obtain the requested n-gram/probability pair from the chained hash table and then execute an insertion request to insert the requested n-gram/probability pair into the cache structure.

To motivate this example, chained hash table 814 may be a variable sized hash table that uses substantial chaining of probabilities in an individual cache location. This can result in uncertain seek times, because any given request is mapped to a particular cache location and then may have to iterate over multiple probabilities stored at that cache location. Furthermore, the chained hash table may also be stored in a compressed form that uses some processing to obtain usable data.

Now, assume application 112(1) on client device 802(1) wishes to obtain a probability of the n-gram "the quick brown fox" in a particular natural language context, e.g., for translation purposes.

Furthermore, assume cache structure 200(3) is initialized (all IN_USE bits are 0) and empty (no key-value pairs). In this first instance, application 112(1) can send a request to server 810. A corresponding service thread 812 is initiated that first makes a lookup call to cache module 111(3). Since the cache structure is empty, the service thread will receive a NULL or other sentinel value indicating the probability is not available in cache structure 200(3). Next, the service thread can retrieve the probability from chained hash table 814. Once the probability is obtained, the service thread can call an insert routine to insert the probability into cache structure 200(3) for future use.

Over time, cache structure 200(3) can eventually become populated with various n-grams and probabilities as the values are looked up and inserted by service threads that are responding to received requests from various client devices. In some implementations, server 810 may use a different thread for each individual client request, so that at any given time there may be multiple concurrent requests from a particular client device or from different client devices. Cache module 111(3) may implement the aforementioned access control mechanisms to ensure consistency of the data in cache structure 200(3).

As discussed previously, cache module 111(3) can ignore insert requests that are received for a slot that is currently in use. For example, assume a first service thread has requested to insert an n-gram/probability pair for "the purple elephant" and this phrase maps to the same cache slot as "the quick brown fox." Now, while cache module 111(3) is writing "the purple elephant" and corresponding probability to cache structure 200(3), another insertion request is received from a second service thread to insert "the quick brown fox" and corresponding probability. Since the insert operation for "the purple elephant" has not finished (IN_USE is still 1), cache module 111(3) can simply return the second service thread if "the quick brown fox" has been inserted. Thus, the second service thread does not need to block and wait for the insertion request to proceed. Indeed, the second service thread can proceed immediately with further processing after sending the insertion request and does not need to wait for a return value from the insertion request indicating that the insertion request for "the quick brown fox" has failed. This is also true for the first service thread, e.g., the first service thread can proceed without waiting for a return value indicating the insertion request for "the purple elephant" was successful.

As also discussed previously, some implementations allow for a "false negative." Consider a situation where "the quick brown fox" and corresponding probability are present in cache structure 200(3). Assume a first service thread attempts to lookup "the quick brown fox" and immediately thereafter a second service thread also attempts to lookup "the quick brown fox." If the first lookup operation has not completed (e.g., IN_USE for the cache slot is set to 1) when the second service thread attempts the lookup, the second service thread receives a sentinel value indicating the probability cannot be retrieved. Thus, the second service thread can proceed to access the chained hash table 814 even though the requested probability was actually available in cache structure 200(3).

Note that further implementations may use various multi-tiered caching techniques in accordance with the disclosed implementations. For example, some implementations may provide cache structure 200(1) and a chained hash table together on an individual client device. Other implementations may use a relatively small cache structure 200(1) on an individual client device in conjunction with a larger cache structure 200(3) on server 810. In further implementations, a given cache structure and associated cache module functionality can be distributed across multiple devices, e.g., in a peer-to-peer network.

CONCLUSION

The order in which the example methods are described is not intended to be construed as a limitation, and any number of the described blocks or steps can be combined in any order to implement the methods, or alternate methods. Furthermore, the methods can be implemented in any suitable hardware, software, firmware, or combination thereof, such that a computing device can implement the methods. In one case, the methods are stored on one or more computer-readable storage media as a set of instructions such that execution by one or more computing devices causes the one or more computing devices to perform the method.

Although techniques, methods, devices, systems, etc. discussed herein are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by executing software instructions with a processor, the method comprising:
 receiving lookup requests from calling threads to obtain requested data items from a software cache data structure having a plurality of slots;
 mapping the requested data items to individual slots of the software cache data structure based on characteristics of the requested data items;
 performing access checks to determine whether the individual slots of the software cache data structure are being used by other threads; and
 after performing the access checks, selectively checking whether the requested data items are stored in the individual slots of the software cache data structure based on whether the individual slots are being used by the other threads, the selectively checking comprising:
  for first lookup requests from first calling threads where the individual slots are being used by the other threads, returning to the first calling threads without checking whether corresponding requested first data items are stored in the software cache data structure, and
  for second lookup requests from second calling threads where the individual slots are not being used by the other threads, checking whether corresponding requested second data items are stored in the software cache data structure.

2. The method of claim 1, wherein at least some of the requested first data items are stored in the software cache data structure when returning to the first lookup requests.

3. The method of claim 1, further comprising:
 maintaining a plurality of access control bits in association with the plurality of slots of the software cache data structure.

4. The method of claim 3, wherein performing the access checks comprises performing compare-and-swap operations on access control bits that are associated with the individual slots.

5. The method of claim 3, wherein the software cache data structure comprises a single array or multiple arrays.

6. The method of claim 1, further comprising:
 when the requested second data items are stored in the software cache data structure, providing the requested second data items in response to the second lookup requests.

7. The method of claim 1, wherein the requested data items have variable sizes.

8. A computing device comprising:
a processor; and
a memory or storage device storing software instructions which, when executed by the processor, cause the processor to:
 receive an insertion request from a calling thread to insert a data item into a software cache data structure having a plurality of slots;
 map the data item to an individual slot of the software cache data structure by applying a hashing function to an identifier of the data item to obtain a hash value, the individual slot being identified by bits of the hash value;
 perform an access check to determine whether the individual slot of the software cache data structure is available; and
 in an instance when the individual slot is not available, return to the calling thread without inserting the data item into the software cache data structure,
 wherein the software cache data structure has a number of slots that is based on a number of the bits of the hash value that are used to identify the individual slot.

9. The computing device of claim 8, wherein the returning to the calling thread does not indicate whether the data item was inserted into the software cache data structure.

10. The computing device of claim 8, wherein the software instructions, when executed by the processor, cause the processor to:
 receive another request to insert another data item into the software cache data structure;
 map the another data item to another slot of the software cache data structure; and
 in an instance when the another slot is available, store the another data item in the another slot.

11. The computing device of claim 8, wherein the bits of the hash value that are used to identify the individual slot are low order bits of the hash value.

12. The computing device of claim 8, wherein the bits of the hash value that identify the individual slot are a subset of bits of the hash value.

13. The computing device of claim 12, wherein the software instructions, when executed by the processor, cause the processor to:
 obtain a fingerprint for the data item from a different subset of bits of the hash value; and
 store the fingerprint in the individual slot with the data item.

14. The computing device of claim 12, wherein the software cache data structure has a fixed number of slots.

15. A system comprising:
a cache module comprising software instructions;
a processor configured to execute the software instructions of the cache module; and
a memory or storage,
wherein the software instructions of the cache module cause the processor to:
 store a plurality of data items in a plurality of slots of a cache data structure, the cache data structure being stored in the memory or storage;
 receive, from a calling thread, a lookup request to retrieve a requested data item that maps to an individual slot of the cache data structure;
 perform an access check to determine whether the individual slot is in use;
 when the access check indicates the individual slot is not in use, check whether the requested data item is present in the cache data structure; and when the access check indicates the individual slot is in use, return to the calling thread without checking whether the requested data item is present in the cache data structure.

16. The system according to claim 15, wherein the software instructions of the cache module further cause the processor to:

return the requested data item when the requested data item is present in the cache data structure.

17. The system according to claim 15, wherein software instructions of the cache module further cause the processor to:

perform an operation on an identifier of the requested data item to identify the individual slot to which the requested data item is mapped.

18. The system according to claim 15, wherein the requested data item is present in the cache data structure when returning to the calling thread without checking whether the requested data item is present in the cache data structure.

19. The system according to claim 15, further comprising an application configured to execute in the calling thread and provide the lookup request to the cache module.

20. The system according to claim 15, embodied as a mobile device or as a server.

* * * * *